United States Patent
Donaghey

(10) Patent No.: US 7,828,378 B2
(45) Date of Patent: Nov. 9, 2010

(54) BICYCLE SEAT

(75) Inventor: Robert J. Donaghey, Vista, CA (US)

(73) Assignee: Air Seat Technologies, Inc., Medford, OR (US)

( * ) Notice: Subject to any disclaimer, the term of this patent is extended or adjusted under 35 U.S.C. 154(b) by 205 days.

(21) Appl. No.: 11/852,157

(22) Filed: Sep. 7, 2007

(65) Prior Publication Data
US 2008/0136222 A1 Jun. 12, 2008

Related U.S. Application Data

(60) Provisional application No. 60/843,330, filed on Sep. 7, 2006.

(51) Int. Cl.
B62J 1/00 (2006.01)
B62J 1/10 (2006.01)
B62J 1/26 (2006.01)
B60N 2/40 (2006.01)

(52) U.S. Cl. .................. 297/200; 297/199; 297/452.41

(58) Field of Classification Search .............. 297/195.1, 297/199, 200, 452.41, 452.65
See application file for complete search history.

(56) References Cited

U.S. PATENT DOCUMENTS

| 467,352 | A | * | 1/1892 | Deardorff et al. ........... 297/199 |
|---|---|---|---|---|
| 484,367 | A | * | 10/1892 | Hicks .............................. 297/1 |
| 540,725 | A | * | 6/1895 | Craig .......................... 297/200 |
| 560,963 | A | * | 5/1896 | Bartlett ....................... 297/200 |
| 562,919 | A | * | 6/1896 | Sager .......................... 297/200 |
| 564,588 | A | * | 7/1896 | Burgess ...................... 297/312 |
| 584,795 | A | * | 6/1897 | Schrader ..................... 297/199 |
| 608,857 | A | * | 8/1898 | Hildreth ...................... 297/200 |
| 4,445,240 | A | * | 5/1984 | Voorhees ..................... 5/655.5 |
| 4,724,560 | A | * | 2/1988 | Christie ......................... 5/644 |
| 5,003,653 | A | * | 4/1991 | Mar ............................... 5/654 |
| 6,089,668 | A | * | 7/2000 | Peterson ................. 297/452.41 |
| 6,125,486 | A | * | 10/2000 | Rabon ........................... 5/654 |
| 6,135,550 | A | * | 10/2000 | Tucho ......................... 297/199 |
| 6,185,765 | B1 | * | 2/2001 | High .............................. 5/419 |
| 6,413,194 | B1 | * | 7/2002 | Gant .......................... 482/112 |
| 7,069,609 | B2 | * | 7/2006 | Zheng ............................ 5/654 |
| 7,114,783 | B2 | * | 10/2006 | Warren et al. .......... 297/452.41 |
| 7,393,051 | B2 | * | 7/2008 | Donaghey ................... 297/199 |
| 7,441,294 | B2 | * | 10/2008 | Mossbeck ...................... 5/654 |

* cited by examiner

Primary Examiner—Joseph F Edell
(74) Attorney, Agent, or Firm—Mintz Levin, Cohn, Ferris, Glovsky, and Popeo P.C.

(57) ABSTRACT

A bicycle seat includes a seat base and a bladder assembly mounted to the seat base. The bladder assembly includes an inner bladder surrounded by an outer bladder and at least partially ringed by a ring bladder. Each bladder can be filled to a desired pressure for any type of rider or riding mode. Accordingly, the bicycle seat offers improved cushioning and stability.

8 Claims, 5 Drawing Sheets

BICYCLE SEAT

CROSS-REFERENCE TO RELATED APPLICATION

This application claims the benefit under 35 U.S.C. Section 119(e) of the following: U.S. Provisional Patent Application No. 60/843,330, entitled "BICYCLE SEAT," filed Sep. 7, 2006, which is incorporated by reference herein.

BACKGROUND

The present application is related to bicycle accessories, and more particularly to an air-filled bicycle seat.

When riding on a traditional rigid bicycle seat, a rider's upper leg muscles (abductus magnus) drive into the seat with every stroke, or downward pedal motion, and the gluteus maximus muscles are flexed against the seat causing the body to lift and fall. This causes a substantial energy loss.

Further, there is a developing body of science that confirms that traditional rigid bicycle seats can cause some severe physical impairments, notably male impotency. The penile artery can be easily compressed when traditional seat are ridden, even those having a substantial amount of padding, and the up-and-down motion of the legs of a rider can lead to discomfort or worse.

SUMMARY

This document discloses an improved bicycle seat that employs air or other gas-filled bladders, for adjustable compressibility and support. The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1A:
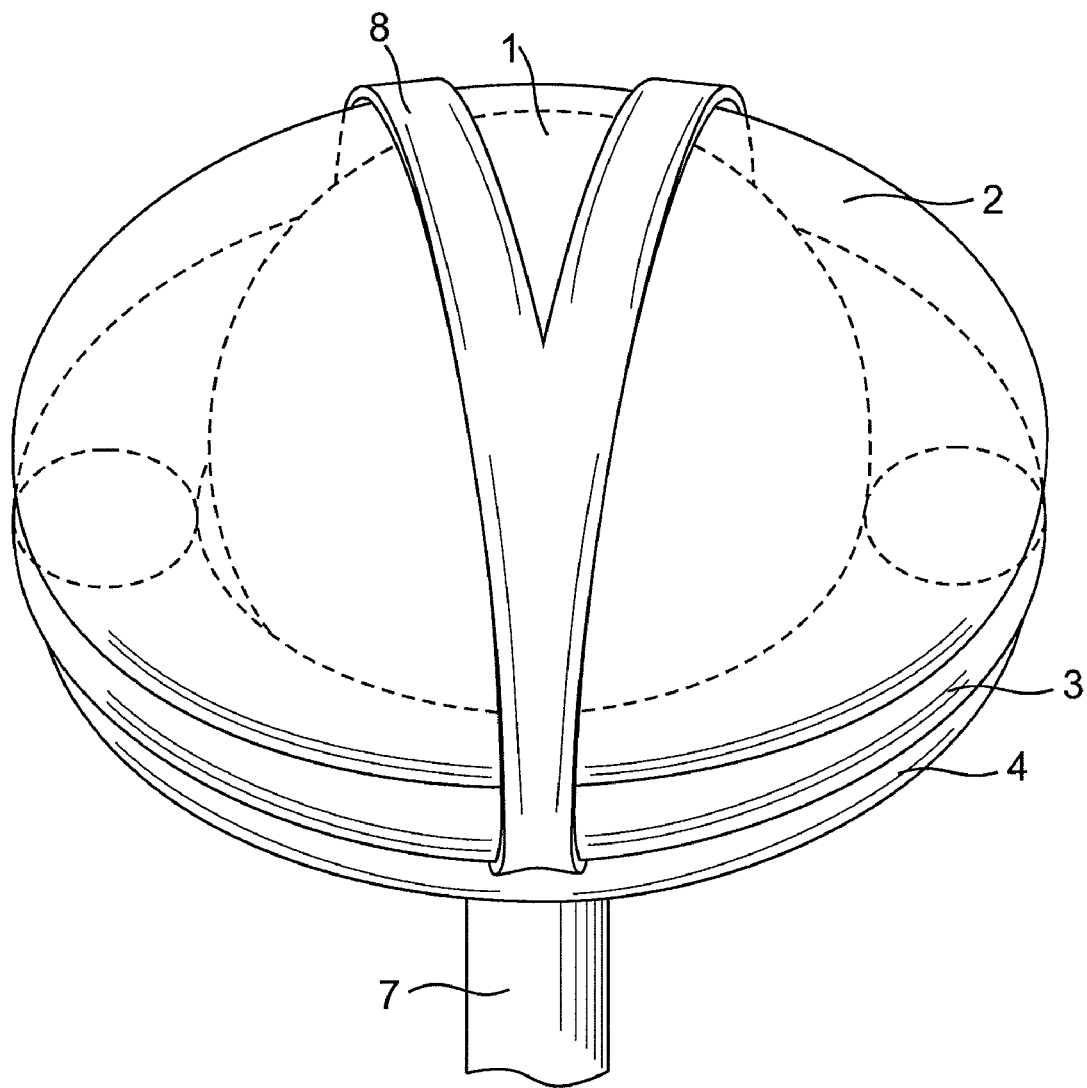
FIGS. 1A-D show various views of a bicycle seat in accordance with an embodiment.
Figure 1B:
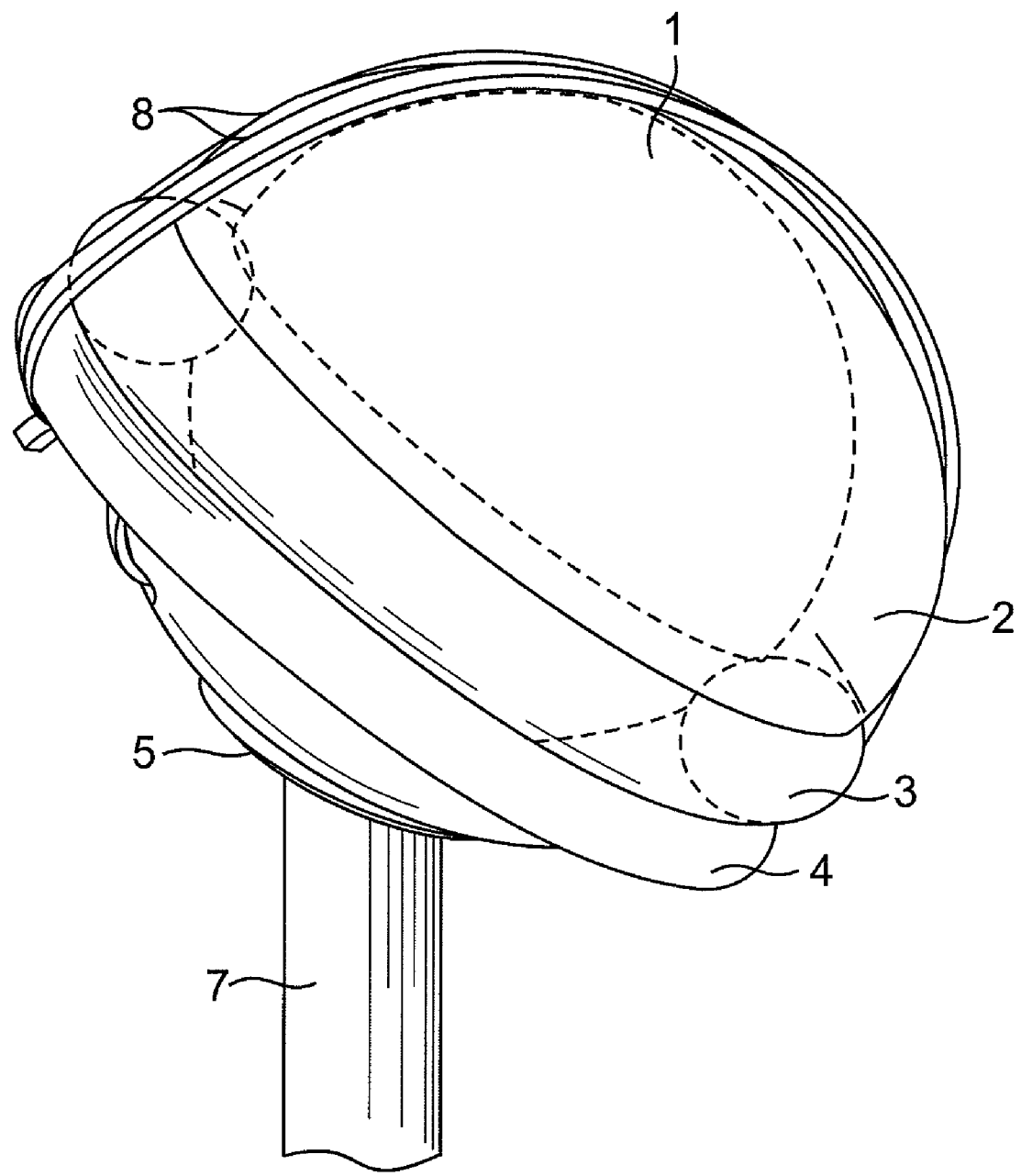
Figure 1C:
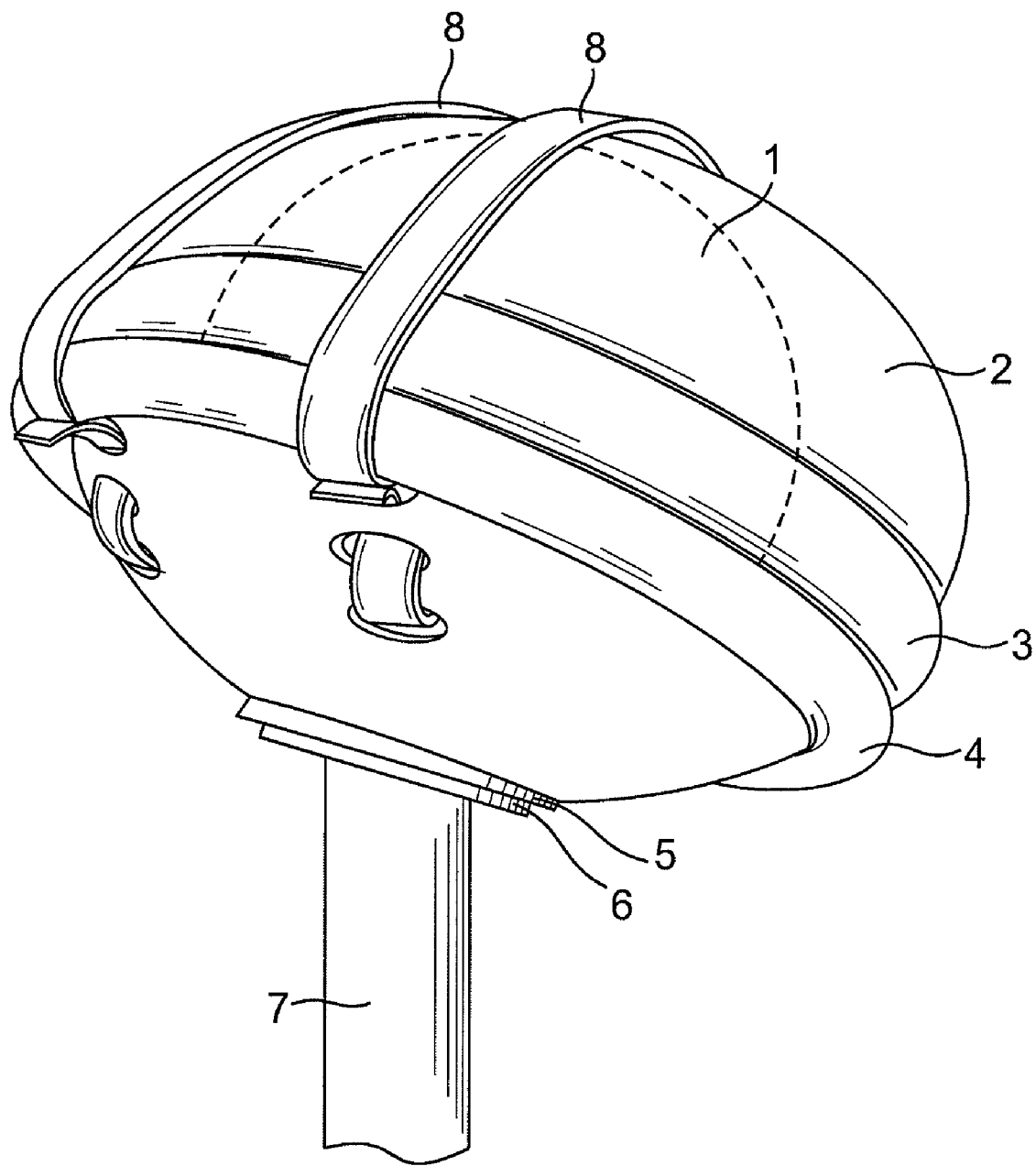
Figure 1D:
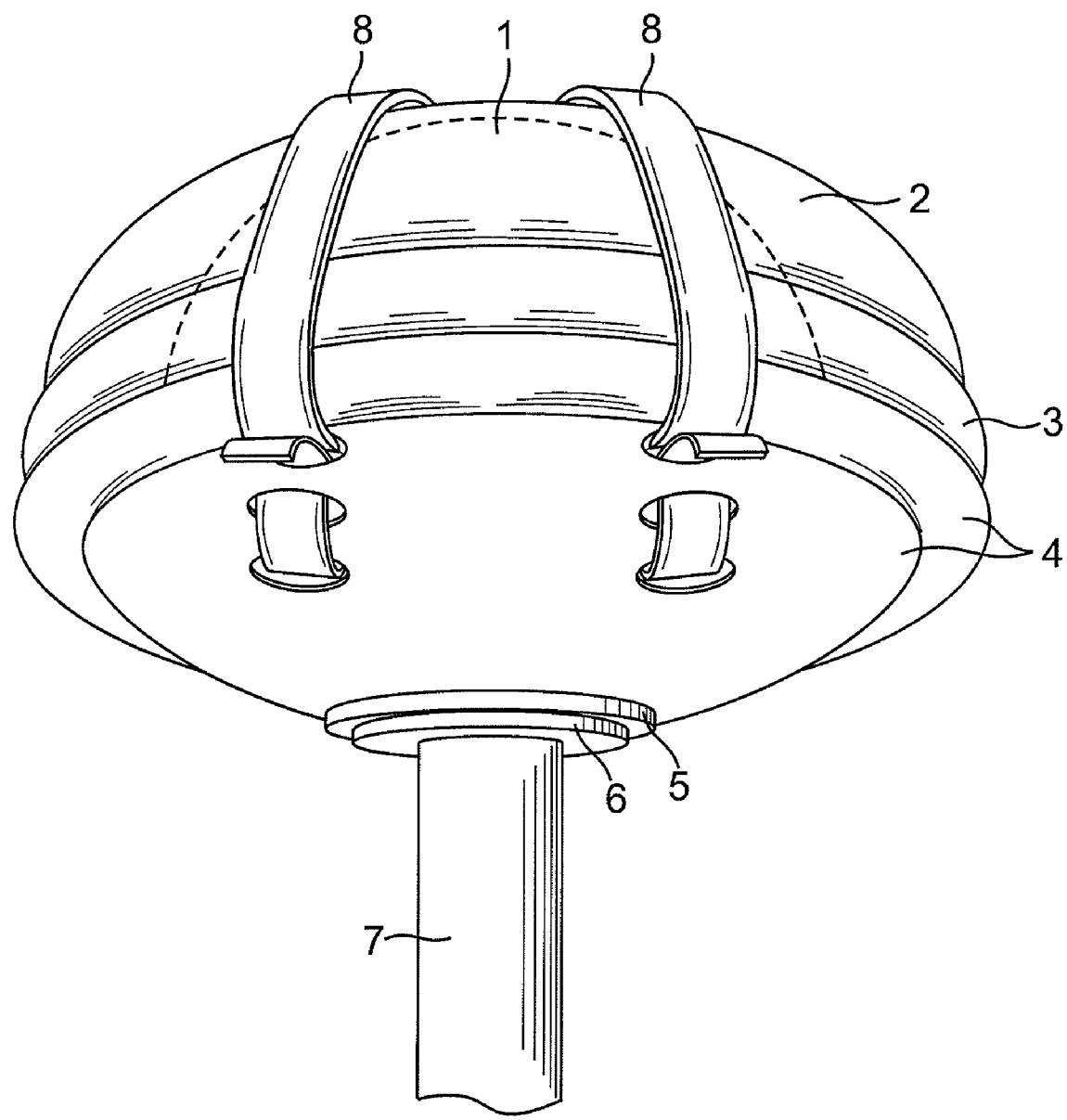

FIGS. 1A-1D illustrate various views of a seat 100. The seat 100 includes an inner bladder 1 contained within an outer bladder 2. The inner bladder can also be at least partially surrounded by a ring bladder 3. The ring bladder 3 can be in the shape of a ring, or in the shape of a curved tubular bladder.

One or more straps 8 are positioned over the outer bladder 2 to hold the bladder assembly in a supporting base 4. The straps 8 prevent the bladders from rolling too far in any direction, particularly when braking, since the rider could otherwise roll too far forward. Each strap 8 can be glued or bolted to the front of the base 4. Optionally, the straps 8 attach to or are threaded through a single slot in the front and/or rear of the base 4.

Pressure of the ring bladder 3, either by a pressure in or a force exerted upon it, allows less movement of the inner bladder 1. Correspondingly, less pressure in the ring bladder 3 allows for more movement of inner bladder 1. Thus, side-to-side motion of the seat 100 can be adjusted by adjusting the pressure of the ring bladder 3. The ring bladder 3 also protects the rider from bottoming out and hitting the edge of the supporting base 4 (or "base support"). The edge of the base 4 is rounded should this occur, to prevent piercing of any of the bladders 1, 2 or 3.

The respective pressures within inner bladder 1 and outer bladder 2 can be adjusted for various types of riders and/or various types of comfort or riding conditions. Preferably, the pressure in the inner bladder 1 exceeds the pressure of the remaining internal volume of the outer bladder 2. In exemplary embodiments, bladder 2 is at a very low pressure (i.e. only slightly above atmospheric pressure), and bladder 1 has slightly more pressure relative to bladder 2 so that the outer surface is as soft as possible and bladder 1 offers just enough support. The pressure in bladder 3 is adjusted to stabilize the potential movement of bladder 1: more pressure stabilizes bladder 1 allowing it to be more supporting, and less pressure allows bladder 1 to move around more for increased freedom of movement, but offering less side-to-side support to the rider.

Figure 2:
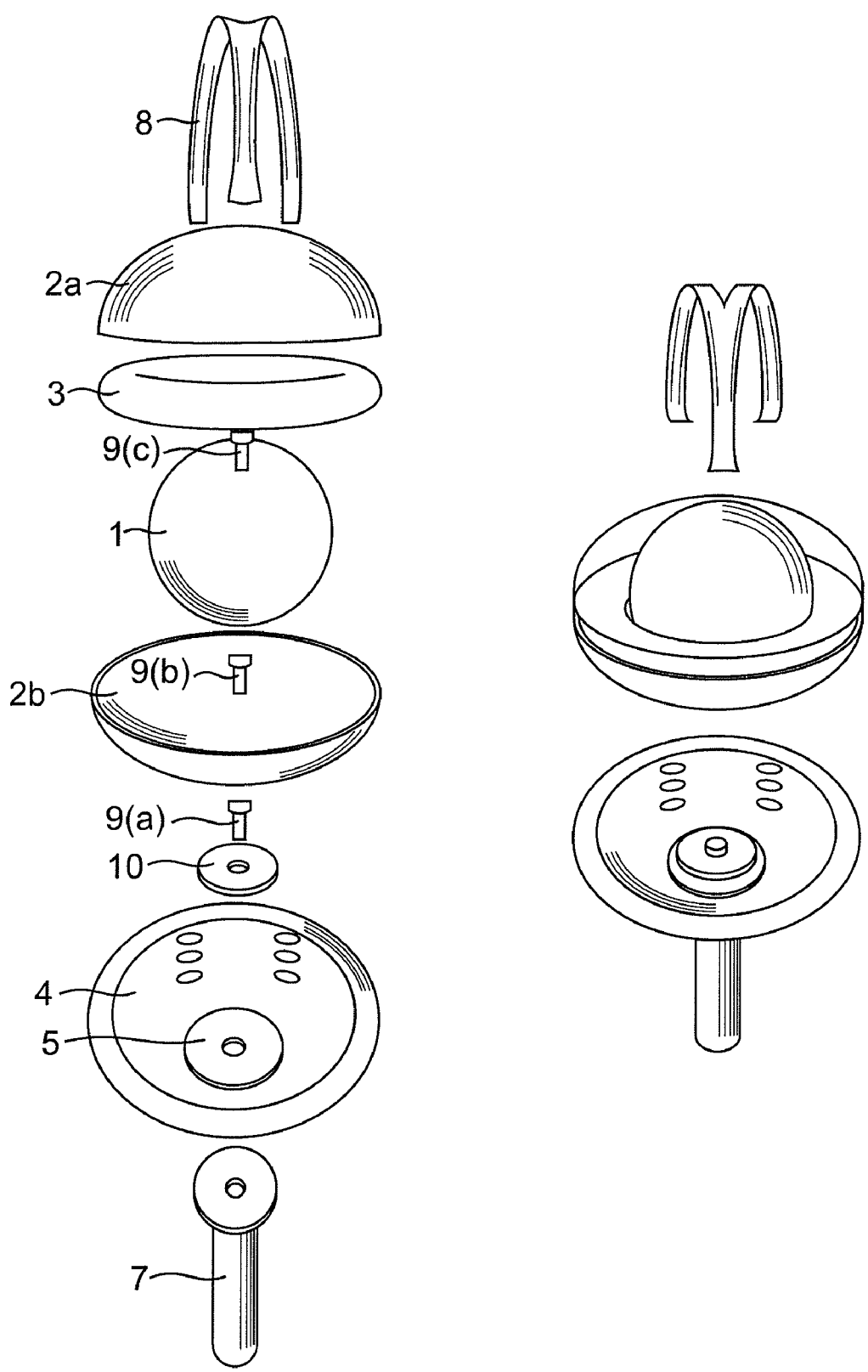
FIG. 2 is an exploded view of an embodiment of a bicycle seat.

FIG. 2 is an exploded view of a seat 100 to illustrate construction of the seat 100 in accordance with some exemplary embodiments. A bottom portion of an outer bladder 2b is placed within a base 4 and glue is applied to the top edge of the bottom portion of the outer bladder 2b. A ring bladder 3 is positioned on top of the top edge of the bottom portion of the outer bladder 2b, and an inner bladder 1 is inserted within ring bladder 3, secured by a bead of glue. Glue is rolled onto the lower edge of a top portion of the bladder 2a, which is then placed on the bottom portion of the outer bladder 2b.

The base 4 is preferably formed as a shallow inverted dome or bowl, but may also have different contours and shapes. The base 4 can be made of any type of plastic. In some preferred embodiments, the base is made of epoxy and carbon fiber, including a hollow rounded or tubular outer edge, or other shaped edge, for added stability for the bladders and the rider. The base 4 includes a mount washer 5 that attaches to a first washer clamp 6 on a seat post 7. A pass-through valve 9 can be inserted through a second washer clamp 10 for air access to inner bladder 1 and/or outer bladder 2.

The straps 8 can be any fabric such as nylon, or formed of soft plastic. The seat post 7 can be any plastic or metal. Any seat post clamp that has a flat surface between the washer clamps will work. The washer clamp 6 is rigid, while mount washer 5 can have a slight flexibility to spread out the load at the edge slightly. The bladders 1, 2 and/or 3 may be made out of any rubber, cloth or plastic, and in some embodiments are formed of expanded PVC foam. Ring bladder 3 may be formed of a more stable and durable plastic so that it is more supportive.

Air being sent into or out of any of the bladders can be accomplished by any type of air valve 9(a)-9(c), which can be placed anywhere on the surfaces of bladders 2 and 3. Bladder 1 does not require a valve, but it may have one 9(b) that is in line with the valve 9(a) for bladder 2, allowing a technician to insert an inflating needle through outer valve 9(a) for bladder 2 and then through outer valve (9a) to inner valve 9(b) for bladder 1. This could be done to compensate for extreme altitude or for other applications. The ring bladder 3 may additionally have a valve 9(c).

The seat as allows the gluteus maximus to flex without lifting the body. When pedaling, one leg balances the other. In other words, a pressure exerted by one leg is transferred to and applied against the other leg—as one leg goes up the other goes down in perfect balance. There is no pressure change in the seat itself, but rather just a gentle air shift. The seat significantly increases pedaling efficiency, and gives bicycle racers a considerable advantage over traditional designs.

The rider may also be positioned forward on the seat so that more of the rider's weight is pushing forward and made available to the legs for pedaling strength. Further, the rider may shift their weight from side-to-side while on the seat, as when standing on the pedals during a sprint.

The seat can have up to eight or more inches of suspension travel in all directions, causing the seat to act as a shock absorber and allowing the bike to rise over small bumps in the road with less impedance. Accordingly, a rider can perform their bicycle riding with much less fatigue than with using traditional seats.

Although a few embodiments have been described in detail above, other modifications are possible. Other embodiments may be within the scope of the following claims.

What is claimed is:

1. A bicycle seat, comprising:
   An angled seat base; and
   a bladder assembly mounted to the seat base, the bladder assembly comprising an inner bladder surrounded by an outer bladder and at least partially ringed by a ring bladder, each of the bladders including a valve, wherein the valve of the inner bladder is surrounded by the outer bladder and is in line with the valve of the outer bladder so that a user can insert an inflating needle through the valve of the outer bladder and then through the valve of the inner bladder.

2. A bicycle seat in accordance with claim 1, further comprising one or more straps connected to the base and overlying the bladder assembly.

3. A bicycle seat in accordance with claim 1, wherein the seat base includes a cupped base member coupled on a neck.

4. A bicycle seat in accordance with claim 3, wherein the cupped base member includes a tubular ring along at least a major portion of a top edge of the cupped base member.

5. A bicycle seat, comprising:
   a bladder assembly comprising an inner gas-filled bladder surrounded by an outer gas-filled bladder, each gas-filled bladder having a valve and being inflatable to a pressure, wherein the valve of the inner gas-filled bladder is surrounded by the outer gas-filled bladder and is in line with the valve of the outer gas-filled bladder so that a user can insert an inflating needle through the valve of the outer gas-filled bladder and then through the valve of the inner gas-filled bladder; and
   a seat base adapted to hold the bladder assembly.

6. A bicycle seat in accordance with claim 5, further comprising a tubular bladder surrounded by the outer gas-filled bladder and at least partially ringing the inner gas-filled bladder.

7. A bicycle seat, comprising
   a seat base; and
   a bladder assembly mounted to the seat base, the bladder assembly comprising an inner bladder surrounded by an outer bladder and at least partially ringed by a ring bladder, each of the bladders including a valve, wherein the valve of the inner bladder is surrounded by the outer bladder and is in line with the valve of the outer bladder so that a user can insert an inflating needle through the valve of the outer bladder and then through the valve of the inner bladder, and further wherein the ring bladder is mated between a top portion of the outer bladder and a bottom portion of the outer bladder.

8. A bicycle seat in accordance with claim 7, wherein the inner bladder and outer bladder are filled with a gas to a desired pressure.

* * * * *